United States Patent
Ikeda et al.

(10) Patent No.: US 7,665,849 B2
(45) Date of Patent: Feb. 23, 2010

(54) COLOR SEPARATING UNIT AND PROJECTION TYPE VIDEO DISPLAY APPARATUS PROVIDED WITH THE SAME

(75) Inventors: Hidehiro Ikeda, Yokohama (JP); Masahiko Yatsu, Fujisawa (JP); Koji Hirata, Yokohama (JP); Kei Adachi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 575 days.

(21) Appl. No.: 11/471,030

(22) Filed: Jun. 19, 2006

(65) Prior Publication Data

US 2007/0019163 A1 Jan. 25, 2007

(30) Foreign Application Priority Data

Jul. 19, 2005 (JP) .............................. 2005-207952

(51) Int. Cl.
G03B 21/14 (2006.01)

(52) U.S. Cl. .......................................... 353/20; 353/84

(58) Field of Classification Search ................... 353/20, 353/84, 30, 31, 33, 34, 122, 487, 488, 490, 353/491, 492, 496; 359/216.1, 217.1, 218.1, 359/219.1, 219.2
See application file for complete search history.

(56) References Cited

U.S. PATENT DOCUMENTS

| | | | | |
|---|---|---|---|---|
| 6,587,269 B2 * | 7/2003 | Li | ............................... | 359/497 |
| 6,739,723 B1 * | 5/2004 | Haven et al. | ................... | 353/20 |
| 6,765,705 B2 * | 7/2004 | Ouchi | ....................... | 359/216.1 |
| 6,827,450 B1 * | 12/2004 | McGettigan et al. | .......... | 353/31 |
| 6,830,339 B2 * | 12/2004 | Maximus | ..................... | 353/20 |
| 6,857,761 B2 * | 2/2005 | Chang | ........................ | 362/234 |
| 6,870,683 B2 * | 3/2005 | Park | ............................ | 359/634 |
| 7,325,957 B2 * | 2/2008 | Morejon et al. | ............. | 362/555 |
| 2002/0135874 A1 | 9/2002 | Li | | |
| 2002/0140908 A1 * | 10/2002 | Kim et al. | ..................... | 353/31 |
| 2003/0095213 A1 | 5/2003 | Kanayama et al. | | |
| 2003/0164901 A1 | 9/2003 | Ouchi et al. | | |
| 2003/0198050 A1 | 10/2003 | Yamazaki et al. | | |
| 2006/0285085 A1 * | 12/2006 | Hirota et al. | .................. | 353/85 |
| 2007/0165189 A1 * | 7/2007 | Kawase et al. | ................ | 353/31 |

FOREIGN PATENT DOCUMENTS

| | | |
|---|---|---|
| CN | 1549047 A | 11/2004 |
| CN | 1442722 A | 5/2006 |
| JP | 2004-170549 | 6/2004 |

OTHER PUBLICATIONS

Office action dated Sep. 7, 2007 issued by the State Intellectual Property Office of China (SIPO) for SIPO patent application CN200610106312.

* cited by examiner

*Primary Examiner*—Georgia Y Epps
*Assistant Examiner*—Bao-Luan Le
(74) *Attorney, Agent, or Firm*—Townsend and Townsend and Crew LLP

(57) ABSTRACT

A projection type video display apparatus having improved color separating ability is provided. The projection type video display apparatus includes a color separating unit including an entrance plate provided with an aperture through which light beams emitted by a light source travel, an optical integrator, and a plurality of dichroic mirrors disposed with their color separating surfaces extended substantially parallel to the exit surface of the optical integrator and capable of transmitting color light beams of wavelengths in a predetermined wavelength range and of reflecting color light beams of wavelengths outside the predetermined wavelength range.

16 Claims, 6 Drawing Sheets

Incident angle: 0° ± θ

Δ = θ

Color separating film

Wavelength separation characteristic

Transmittance

Wavelength

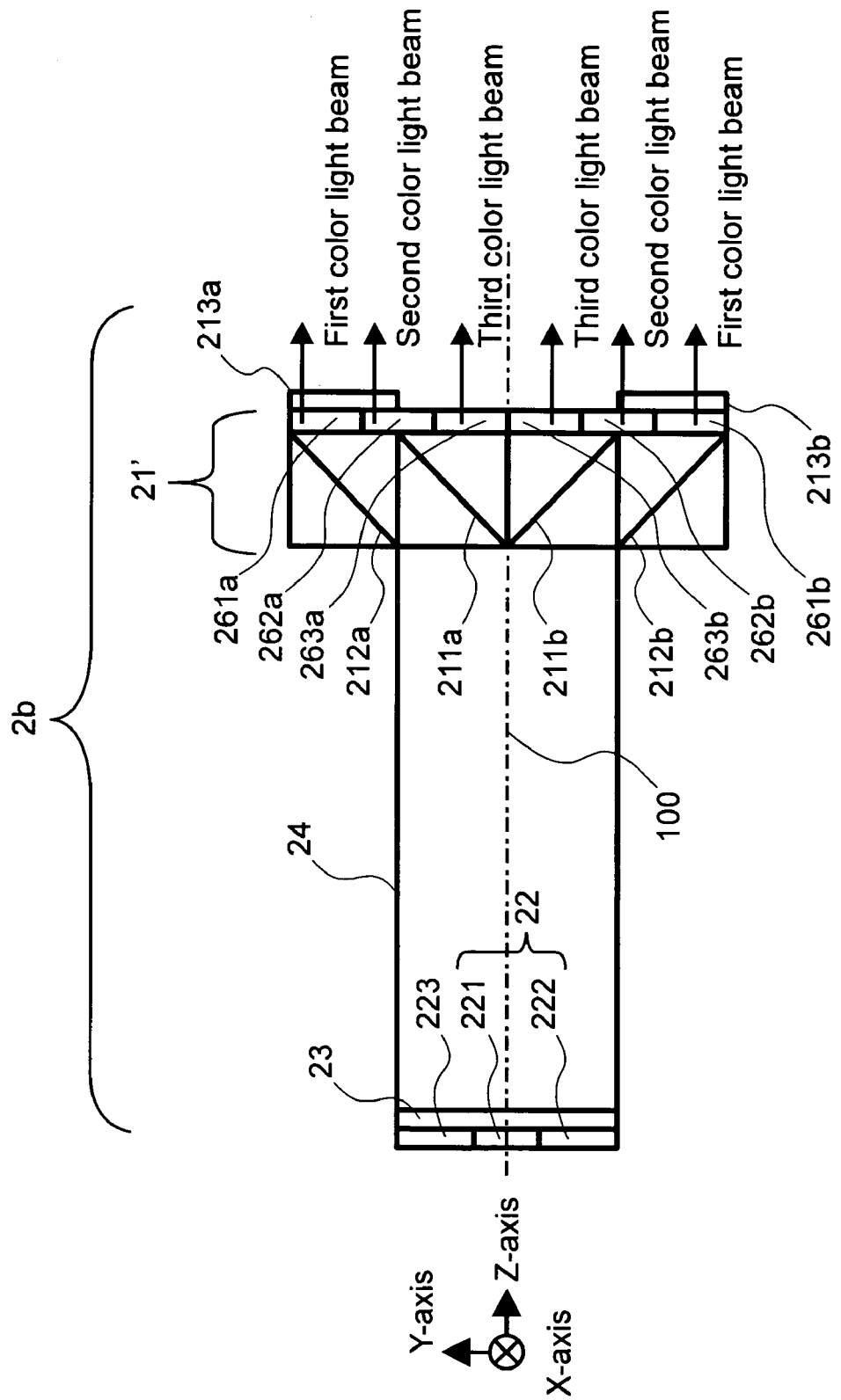

Incident angle: 45° ± θ

Δ = 2θ

Color separating film

Wavelength separation characteristic

Transmittance

Wavelength

COLOR SEPARATING UNIT AND PROJECTION TYPE VIDEO DISPLAY APPARATUS PROVIDED WITH THE SAME

BACKGROUND OF THE INVENTION

The present invention relates to a projector using a video display for projecting images on a screen, such as a liquid crystal projector, a reflection image projector, an optical unit such as a rear projection television display, and a projection type video display.

A known single-chip projection display passes a light beam emitted by a white light source sequentially through an integrator and a polarization beam splitter (herein-after, "PBS"), divides the light beam into an R color bar, a B color bar and a G color bar using a plurality of dichroic mirrors, deflects the color bars with a rotating polygon reflector to irradiate different parts of a light bulb simultaneously. At the same time, the color bars are moved in a fixed direction for scanning or scrolling on the light bulb. Techniques relating to this single-chip projection display are disclosed in JP-A 2004-170549 and U.S. Pat. Pub. No. 2003/095213, for example.

Such a scanning (or scrolling) projection display device scrolls information represented by the color bars of the three colors and displayed on a light bulb by a rotating polygon reflector. FIG. 1 shows a projection display device disclosed in U.S. Pat. Pub. No. 2003/095213 by way of example. As shown in FIG. 1, the projection display device forms three adjacent color bars using a color separator including dichroic prisms and, at the same time, scrolls the three color bars with a lens array wheel. A scanning projection display device disclosed in JP-A 2004-170549, as shown in FIGS. 1, 3A and 3B attached to the specification thereof, deflects separated three color beams individually with rotating polygon reflectors placed in the optical paths of the three color light beams for scrolling.

BRIEF SUMMARY OF THE INVENTION

Each of the lenses of the lens array wheel of the projection display device disclosed in U.S. Pat. Pub. No. 2003/095213 has a size corresponding to that of a liquid crystal display. Therefore, the lens array wheel is heavy. If the size of the lens array wheel is reduced to half to form the projection display device in compact construction, the angular velocity of the lens array wheel needs to be doubled. It is difficult to rotate the lens array wheel at such a high angular velocity.

In the projection display device disclosed in U.S. Pat. Pub. No. 2003/095213, the color separator is disposed with its color separating surface extended obliquely to the optical axis of an illuminating optical system and the optical axis of a rod prism for making uniform a light beam emitted by a light source and reflected by an ellipsoidal mirror. When the color separator is thus disposed, a light beam falling on the color separating surface includes light beams falling at incident angles varying greatly from 45. Consequently, the general wavelength separating characteristic of the color separating surface with all the light beams deteriorates.

Generally, the extent of a space including a light beam that can be effectively handled is expressed by etendue (geometrical extent), namely, the product of the area and solid angle. The product of the area and solid angle is enclosed in an optical system. A substantially white light beam emitted by a light source is collected on the en-trance surface of a rod prism disposed at a position near the second focal point of an ellipsoidal mirror. Since the incident light beam is collected in a small collection area, the incident light beam has a large solid angle; that is, the incident light beam falls at a large angle to the optical axis. The angle of the incident light beam is substantially perfectly preserved in the rod prism. Therefore, the light beam traveling from the rod prism toward the color separator includes light beams that fall on the color separating surface of the dichroic mirror at incident angles varying greatly from 45.

FIGS. 5A and 5B are typical views of the color separating surface of a color separation prism and a light beam. When the range of the angle of an incident light beam to an optical axis is increased as shown in FIG. 5A, a light beam falls on a color separating surface, such as the entrance surface of a dichroic mirror, and the general wavelength separating characteristic of the color separating surface with the light beam deteriorates as shown in FIG. 5B. When the wavelength characteristic deteriorates, transmittance cannot be sharply changed for wavelengths in the portion corresponding to a transmittance of 50%. For example, a blue light beam and a green light beam cannot be separated and part of the blue light beam is included in the green light beam and part of the green light beam is included in the blue light beam. The color separator disclosed in U.S. Pat. Pub. No. 2003/095213 is not intended to align rays of a polarized light beam.

The technique disclosed in JP-A No. 2004-170549 uses a dichroic mirror as a color separating means. The dichroic mirror is disposed at 45 to the optical axis. As shown in FIG. 1 showing the technique, a lens array is used as an integrator for making light intensity distribution uniform. Consequently, a light beam falls on the dichroic mirror in a large area and the solid angle of the etendue decreases. Since the range of the incident angle of the light beam falling on the dichroic mirror is narrow, the wave-length separation characteristic deteriorates slightly. Therefore, there is no problem related to the deterioration of the wavelength separation characteristic of the dichroic mirror disposed at 45 to the optical axis in the technique disclosed in JP-A No. 2004-170549. However, when a plurality of rotating polygon reflectors are used, the projection display device inevitably becomes large; the light beam becomes large; and rotating polygon reflectors need to be enlarged accordingly when an ordinary lens array is employed; consequently, the projection display device becomes large. If the respective positions of the three bar-shaped illuminated areas are dislocated relative to each other, color light beams of different colors fall simultaneously on a single area, or none of the color light beams fall on some areas. Therefore, the plurality of rotating polygon reflectors need to be accurately controlled.

It is an object of the present invention to improve the optical efficiency of a color separating unit provided with a polarization converting device.

Another object of the present invention is to improve the color separating characteristic of a projection type video display apparatus or a color separating unit and to reduce the mixing of different colors.

A third object of the present invention is to provide a projection type video display apparatus including: a color separating unit having an entrance plate provided with an aperture through which a light beam emitted by a light source travels and an integrator, and including a dichroic mirror having a color separating surfaces each for transmitting a color light beam of a predetermined wavelength. The dichroic mirror further reflects color light beams of wavelengths other than the predetermined wavelength and is disposed on the exit side of the integrator with the color separating surfaces thereof ex-tended substantially parallel to the exit surface of the integrator.

BRIEF DESCRIPTION OF THE DRAWINGS

FIG. 4 is a view of a color separating unit in a second embodiment according to the present invention;

DESCRIPTION OF THE PREFERRED EMBODIMENTS

Figure 1:
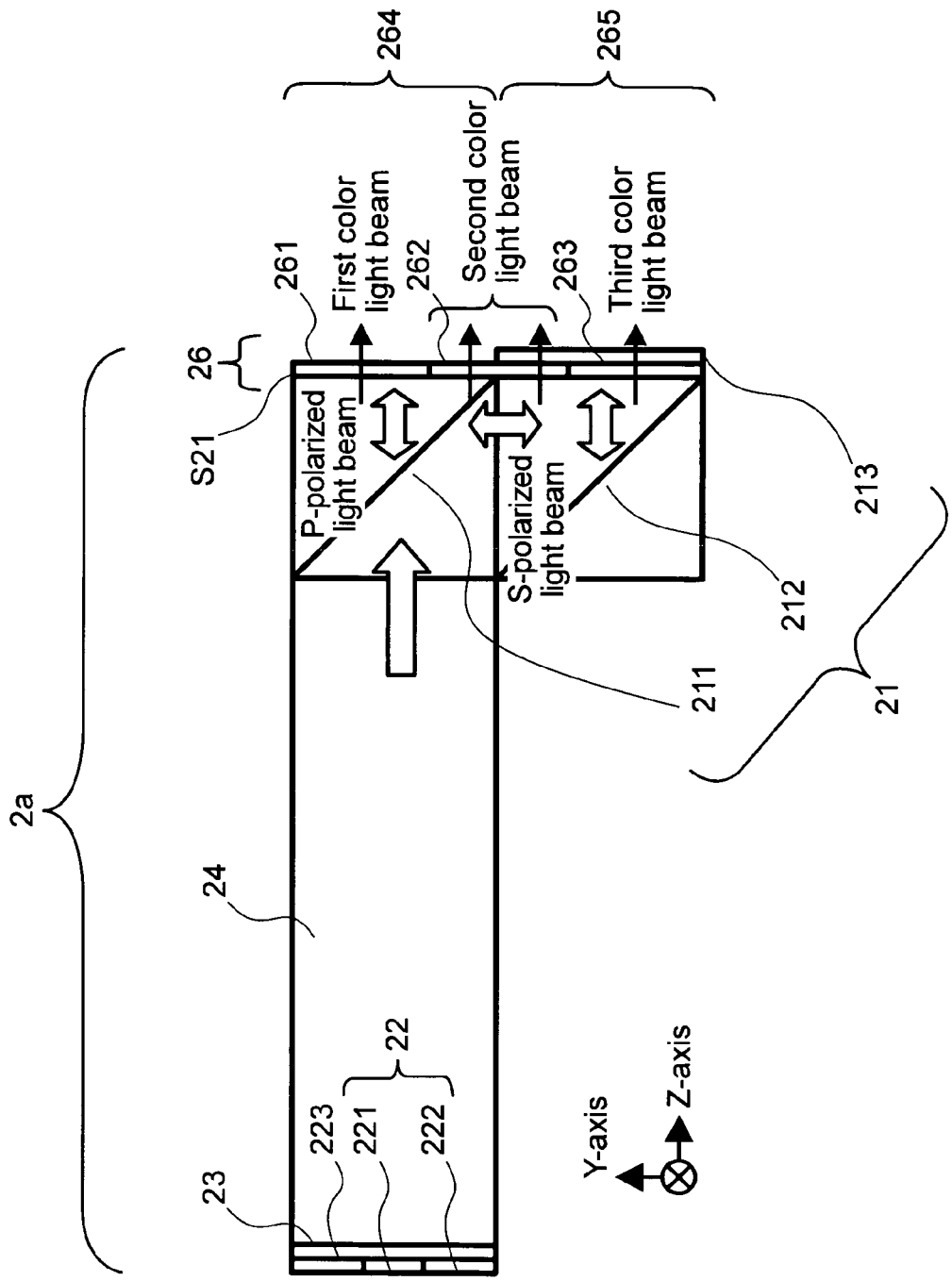
FIG. 1 is a schematic view of a color separating unit in a first embodiment according to the present invention.
Figure 2:
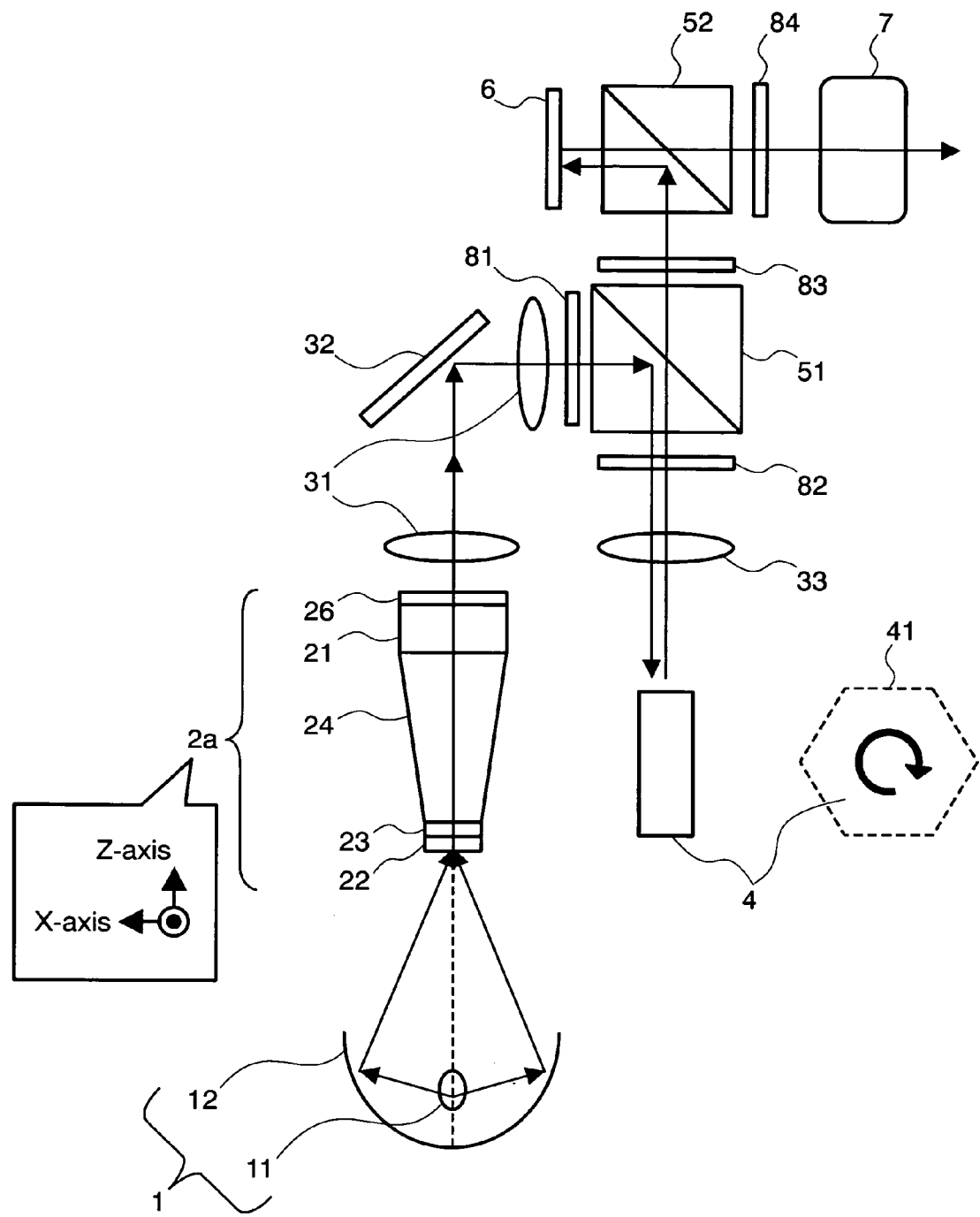
FIG. 2 is a diagrammatic view of a projection type video display apparatus embodying the present invention.
Figure 3A:
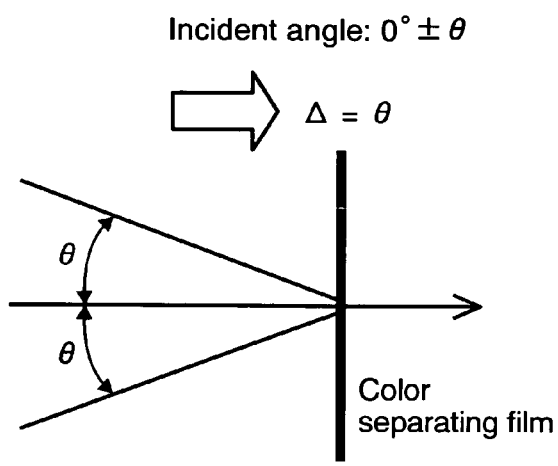
FIGS. 3A and 3B are views illustrating the dependence of the color separating characteristic on the incident angle of a light beam falling on a color separating surface.
Figure 3B:
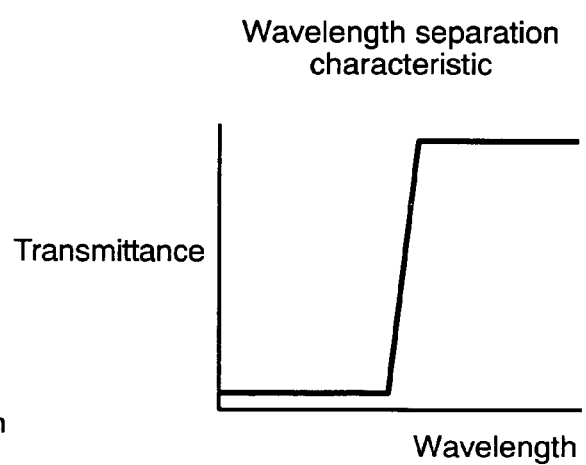

Preferred embodiments of the present invention are now described with reference to the accompanying drawings, in which like parts are designated by the same reference characters and the description of parts like those already described will be omitted to avoid duplication.

a color separating unit in a first embodiment according to the present invention and a projection type video display apparatus including the color separating unit and a single rotating polygon reflector are described with reference to FIGS. 1 to 3. FIG. 1 is a schematic view of the color separating unit in the first embodiment; FIG. 2 is a diagrammatic view of the projection type video display apparatus embodying the present invention; and FIGS. 3a and 3b are views to illustrate the dependence of color separating characteristic on the incident angle of a light beam falling on a color separating surface.

A scanning projection type video display apparatus embodying the present invention is described with reference to FIGS. 1 and 2. Referring to FIG. 2, a substantially white light beam emitted by a light source unit 1 including a light source 11 and an ellipsoidal reflector (hereinafter, "reflector") 12 falls on the entrance surface of color separating unit 2a disposed near the second focal point of reflector 12.

referring to FIG. 1, the color separating unit 2a includes an entrance aperture plate 22 provided with an optical entrance aperture 221 and a total-reflection surface 222, a quarter-wave plate 23, a light pipe 24, namely, an integrator for making light intensity distribution uniform, a polarization converting device 21 for converting the direction of polarization of the light beam that travels through the light pipe 24 into a predetermined direction of polarization, and a dichroic mirror 26, namely, a color-separating device for dividing the light beam that travels through the polarization converting device 21 into three color bars, such as an r light bar (red light bar), a b light bar (blue light bar) and a g light bar (green light bar) arranged along a y-axis ex-tending in a direction perpendicular to the paper in FIG. 2.

The polarization converting device 21 has a first polarized light-separating prism 211 that transmits a p-polarized light beam and reflects an s-polarized light beam and a second polarized light-separating prism 212 that reflects an s-polarized light beam. In color separating unit 2a shown in FIG. 1, the exit surface of light pipe 24 and the en-trance surface of the first polarized light separating prism 211, respectively, have substantially the same areas. A light beam passed through the exit surface of light pipe 24 falls on the first polarized light separating prism 211.

A substantially white natural light beam emitted by light source unit 1 and passed through optical entrance aperture 221 passes through quarter-wave plate 23. A natural light beam passed through quarter-wave plate 23 remains intact. The light beam passed through quarter-wave plate 23 is reflected repeatedly by the side surfaces of light pipe 24 to make the light intensity distribution uniform. The light beam having a uniform light intensity distribution falls on polarization converting device 21 which converts the light beam into a p-polarized light beam.

Polarization converting device 21 includes first polarized light separating prism 211, second polarized light separating prism 212 and a half-wave plate 213. The first polarized light separating prism 211 and the second polarized light separating prism 212 are arranged along the y-axis. First polarized light separating prism 211 receives the light beam traveling through light pipe 24. Second polarized light separating prism 212 is disposed on the lower side of first polarized light separating prism 211 on the y-axis, as shown in FIG. 1. Half-wave plate 213 is disposed behind dichroic mirror 26 disposed on the exit side of second polarized light separating prism 212 with respect to the traveling direction of the light beam.

The p-polarized light beam included in the light beam, which has traveled through light pipe 24 and has fallen on polarization converting device 21, passes through first polarized light separating prism 211; the s-polarized light beam included in the same light beam is reflected by first polarized light separating prism 211. Thus the p-polarized light beam and the s-polarized light beam are separated. The s-polarized light beam reflected by first polarized light separating prism 211 is reflected again by second polarized light separating prism 212 in the direction of travel of the p-polarized light beam parallel to the z-axis and the thus reflected s-polarized light beam is converted into a p-polarized light beam by half-wave plate 213. Consequently, the light beam is converted entirely into a p-polarized light beam. A polarized light-separating surface having a normal angle contained in an xz-plane separates the p-polarized light beam. The p-polarized light beam is an s-polarized light beam for the polarized light-separating surfaces of a first pbs 51 and a second pbs 52, respectively, having normal angles contained in the xz-plane shown in FIG. 2. Color separation by dichroic mirror 26 and the repetitive use of reflected light will be described later with reference to FIG. 1.

The three separate, s-polarized color light beams forming color bars travel through a reducing optical system 31 and are reflected toward a polarization plate 81 that transmits an s-polarized beam. Polarization plate 81 improves the purity of the color light teams. Then, the color light beams fall on first pbs 51. The color light beams forming the color bars and fallen on first pbs 51 are reflected by a polarized light separating surface toward a rotating polygon reflector 4. A quarter-wave plate 82 converts the s-polarized light beam emerging from first pbs 51 into a circularly polarized light beam. The circularly polarized light beam travels through a reducing optical system 33 and falls on rotating polygon reflector 4. Three color bars of three colors formed on the exit surface of a color separating unit 2a are mapped in a spatial image, not shown, in a space extending in front of rotating polygon reflector 4 by the reducing optical systems 31 and 33.

Reflecting facets 41 of rotating polygon reflector 4 reflect the spatial image toward the optical path. Quarter-wave plate 82 converts the circularly polarized light beam reflected by rotating polygon reflector 4 into a p-polarized light beam. The p-polarized light beam then travels through first pbs 51 and is converted into an s-polarized light beam by half-wave plate 83. Then, the s-polarized light beam, which has fallen on second pbs 52, is reflected by the polarized light separating surface toward a video display 6. During this process, a mirror image, not shown, of the spatial image formed in the space extending in front of rotating polygon reflector 4 is formed on the reflecting facets 41 of rotating polygon reflector 4. The mirror image is enlarged by enlarging optical system 33 functioning as an enlarging optical system with the light beam traveling in the reverse direction. The enlarged mirror image is mapped on video display 6. The mirror image moves as rotating polygon reflector 4 rotates and the separated three color bars move on video display 6; that is, the color bars scan video display 6.

Although the foregoing description has been made on the assumption that optical system 33 functions as a reducing optical system on an optical path along which a light beam travels to rotating polygon reflector 4 and functions as an enlarging optical system on an optical path along which a light beam reflected by rotating polygon reflector 4 travels, the functions of optical system 33 on those optical paths may be inter-changed; that is, optical system 33 may function as an enlarging optical system on the former optical path and may serve as a reducing optical system on the latter optical path. However, the use of optical system 33 as a reducing optical system on the former optical path and as an enlarging optical system on the latter optical path is advantageous because the reducing optical system forms a small spatial image in the space near reflecting facets 41 of rotating polygon reflector 4 and hence rotating polygon reflector 4 may be small.

Light rays reflected by pixels of video display 6 are converted into p-polarized light rays when a voltage is applied to the pixels. The p-polarized light rays are transmitted by second pbs 52 and are projected through a projection lens 7 in an enlarged image on a screen, not shown. The light rays are converted into s-polarized light rays when any voltage is not applied to the pixels. The s-polarized light rays are reflected by the polarizing surface of second pbs 52 and are not projected on the screen. Indicated at 84 is a polarizing plate that transmits p-polarized light beams.

The scanning operation of rotating polygon reflector 4, namely, a scanning unit, is now described. When an object (spatial image) is placed in front of the reflecting facet 41, a mirror image, not shown, of the object is formed at a position behind reflecting facet 41 at a distance equal to the distance between the object and reflecting facet 41 from the reflecting facet 41. The angle of reflecting facets 41 changes as rotating polygon reflector 41 rotates. For example, when reflecting facet 41 turns through an angle, the direction of a reflected light ray turns through an angle 2. The reflected light ray coincides with a light ray that looks as if it is emerging from a different position on the mirror image. Therefore, light rays emerge successively from different positions of the mirror image when the angle of reflecting facet 41 is changed continuously. Thus the light ray can be moved for scanning (scrolling) by changing the angle of reflecting facet 41.

The color separating function of dichroic mirror 26 is now described with reference to FIG. 1. The dichroic mirror 26 may include a plurality of dichroic mirrors or may be a single dichroic mirror having a plurality of separating surfaces. The dichroic mirror employed in this embodiment is supposed to include a plurality of dichroic mirrors. Dichroic mirror 26 has a red dichroic mirror 261 that transmits only red light (r light) and reflects light of colors other than red, a blue dichroic mirror 262 that transmits only blue light (b light) and reflects light of colors other than blue and a green dichroic mirror 263 that transmits only green light (g light) and reflects light of colors other than green. Dichroic mirror 26 is placed on the exit surface s21 of first polarized light separating prism 211 and second polarized light separating prism 212. Blue dichroic mirror 262 is placed in a central area among three areas defined by dividing the exit surface s21 with respect to a direction parallel to the y-axis. Red dichroic mirror 261 is placed in an upper area on the upper side, as viewed in FIG. 1, of blue dichroic mirror 262 and green dichroic mirror 263 is placed in a lower area on the lower side, as viewed in FIG. 1, of blue dichroic mirror 262.

A p-polarized light beam included in a white light beam traveling through light pipe 24 passes through first polarized light separating prism 211. A p-polarized red light beam that has fallen on red dichroic mirror 261 and a p-polarized blue light beam that has fallen on the blue dichroic mirror 262 pass through red dichroic mirror 261 and blue dichroic mirror 262, respectively. A green light beam, a red light beam that has fallen on blue dichroic mirror 262 and blue light beam that has fallen on red dichroic mirror 261 are reflected by dichroic mirror 26. The reflected light beams travel back-ward through first polarized light separating prism 211, light pipe 24 and quarter-wave plate 23. Then those light beams are reflected by the total reflection surface 222 of entrance aperture plate 22, travel forward again and pass through quarter-wave plate 23 again. Consequently, those p-polarized light beams are converted into s-polarized light beams. The s-polarized light beams travel through light pipe 24 and fall on polarization converting device 21.

The s-polarized light beams that have fallen on polarization converting device 21 are reflected by first polarized light separating prism 211 and second polarized light separating prism 212. The s-polarized blue light beam that has fallen on blue dichroic mirror 262 and the s-polarized green light beam that has fallen on green dichroic mirror 263 pass through blue dichroic mirror 262 and green dichroic mirror 263, respectively. The s-polarized red light beam, the green light beam fallen on blue dichroic mirror 262 and the blue light beam fallen on green dichroic mirror 263 are reflected by dichroic mirror 26. Those reflected light beams are reflected by second polarized light separating prism 212 and first polarized light separating prism 211 and travel backward through light pipe 24 and quarter-wave plate 23. Then, those light beams are reflected by total reflection surface 222 of entrance aperture plate 22 and pass again through quarter-wave plate 23. Consequently, those s-polarized light beams are converted into p-polarized light beams.

Thus the light beams that could not be transmitted through dichroic mirror 26 are reflected repeatedly by entrance aperture plate 22 and dichroic mirror 26 and travel repeatedly between the entrance aperture plate and the dichroic mirror. While the light beams are reflected repeatedly, the light beams pass quarter-wave plate 23 in opposite directions. Consequently, the p-polarized light beams are converted into the s-polarized light beams, and the s-polarized light beams are converted into the p-polarized light beams. Thus the p-polarized light beams and the s-polarized light beams are subjected to color separation repeatedly. That is, the p-polarized color light beams reflected by dichroic mirror area 264, i.e., an area including a part of red dichroic mirror 261 and a part of blue dichroic mirror 262, in the exit surface of first polarized light separating prism 211 are converted into the s-polarized color light beams, and the s-polarized color light beams fall on a dichroic mirror area 265, i.e., an area including a part of the blue dichroic mirror and a part of the green dichroic mirror. The s-polarized color light beams reflected by dichroic mirror area 265 are converted into p-polarized light beams and the p-polarized light beams fall on the dichroic mirror area. Polarization converting device 21 and quarter-wave plate 23 make the color light beams reflected by dichroic mirror 26 fall alternately on different dichroic mirror areas. Thus the red, blue and green light beams are separated by the predetermined dichroic mirrors.

More specifically, the p-polarized green light beam reflected by red dichroic mirror 261 and passed to quarter-wave plate 23 twice are converted into an s-polarized light color light beam and the s-polarized color light beam falls on dichroic mirror area 265. Similarly, the p-polarized red light beam reflected by green dichroic mirror 263 and twice passed to quarter-wave plate 23 are converted into a p-polarized light color light beam and the p-polarized color light beam falls on dichroic mirror area 264. The p-polarized blue light beam reflected by red dichroic mirror 261 and the s-polarized blue light beam reflected by green dichroic mirror 263 are separated in a similar manner.

The color light beam reflected by the dichroic mirror area 264 $t$, having raveled back and forth, falls again on dichroic mirror area 264. For example, a p-polarized color light beam reflected from a point in dichroic mirror area 264 becomes a p-polarized light beam after the same has traveled back and forth between quarter-wave plate 23 and dichroic mirror 26 and the p-polarized light beam falls again on dichroic mirror area 264. The light beam reflected from the point in dichroic mirror area 264 has light rays traveling in several directions at different angles to the optical axis, the light rays are dispersed by the light intensity distribution uniforming effect of light pipe 24 and all the light rays of the light beam do not necessarily fall again on the same point in dichroic mirror area 264; that is, all the light rays of the light beam reflected twice are not reflected again by the same dichroic mirror. For example, when the p-polarized blue light beam reflected by red dichroic mirror 261 and having traveled back and forth between the quarter-wave plate 23 and the dichroic mirror 26, falls again on dichroic mirror area 264 again, a part of the blue light beam falls on and passes blue dichroic mirror 262.

Figure 5A:
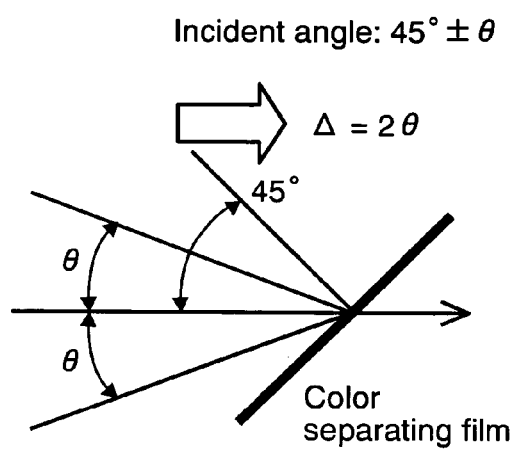
FIGS. 5A and 5B are views illustrating the dependence of the color separating characteristic on the incident angle of a light beam falling on the color separating surface of a known color separating unit.
Figure 5B:
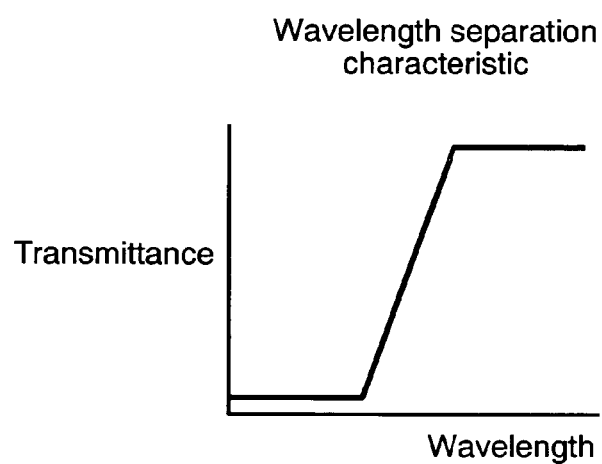

The wavelength separating characteristic of the color separating unit shown in FIG. 1 is now described with reference to FIGS. 3a and 3b showing the relation between the incident angle of an incident light beam on a polarized light separating film and the wavelength separating characteristic of the polarized light separating film. As mentioned above in connection with FIGS. 5a and 5b, when the incident angle of a light beam incident on a color separating surface is in the range of 45, the polarized light separating film is designed on the assumption that the difference between the maximum and the minimum incident angle is 2. Therefore, transmittance for wavelengths in the half width changes gradually and color light beams cannot be sharply separated. Consequently, the color of each of the separated color beams has a low chromaticity.

When an incident light beam falls on a vertical color separating surface at an incident angle as shown in FIG. 3a, the incident angles of light rays contained in the light beam are distributed in the range of with respect to a normal to the color separating surface. Since the light rays are rotationally symmetric, the color separating film may be designed on the assumption that the range of incident angles is. Thus the transmittance for wavelengths in the half width can be changed sharply as shown in FIG. 3b. Consequently, color light beams can be separated sharply and the color of each of the separated color beams has a satisfactory chromaticity.

In the color separator of the projection display device disclosed in U.S. pat. Pub. No. 2003/095213, the ratio of the area of the entrance surface of the color separating unit to that of the exit surface of the same is about 1/3. The ratio of the area of the entrance surface of the color separating unit 2a shown in FIG. 1 to that of the exit surface of the same is 1/2. Thus the ratio of the area of the entrance surface to that of the exit surface in the color separating unit 2a is greater than that in the color separator of the projection display device disclosed in U.S. pat. Pub. No. 2003/095213. Therefore, when the respective entrance surfaces of color separating unit 1a shown in FIG. 1 and the color separator of the projection display device disclosed in U.S. pat. Pub. No. 2003/095213 have the same effective area and the respective exit surfaces of the color separating unit shown in FIG. 1 and the color separator of the projection display device disclosed in U.S. pat. Pub. No. 2003/095213 have the same effective area. The entrance aperture 221 of entrance aperture plate 22 can be formed so that the ratio of the area of entrance aperture 221 to that of entrance aperture plate 22 is small. In color separating unit 2a shown in FIG. 1, a part of the light beam returned to entrance aperture plate 22 leaks through the entrance aperture 221 and travels to light source unit 1. However, the quantity of light that is reflected by dichroic mirror 26, leaks through entrance aperture 221 and travels toward light source unit 1 is small because entrance aperture 221 is small.

Thus the total reflection surface is disposed on the side of the entrance surface of the light pipe. The polarization converting device and the color separating device are disposed on the side of the exit surface of the light pipe and the light reflected by the color separating device travels backward from the exit surface into the light pipe. Thus the color separating unit having the polarization converting function can use light efficiently.

In the light separating unit shown in FIG. 1, polarized light beams traveling forward through the light pipe are separated by the first and the second polarized light separating prism. The dichroic mirror disposed substantially parallel to the exit surfaces of the polarized light separating prisms separates and reflects the color light beams. Therefore, the adverse influence of incident angle on color characteristic can be reduced.

Since the dichroic mirror is disposed substantially parallel to the exit surfaces of the first and the second polarized light separating prisms, the exit surface of the dichroic mirror can be formed in an area equal to the sum of the respective areas of the exit surfaces of the first and second polarized light separating prisms. Consequently, the ratio of the area of the aperture plate of the color separating unit to that of the exit surface of the color separating unit is large and color using efficiency can be improved.

In the color separating unit shown in FIG. 1, the first polarized light separating prism is disposed with the entrance surface thereof extended contiguously with the en-tire surface of the exit surface of the light pipe, making all the light emerging from the light pipe fall on the first polarized light separating prism and the light reflected by the dichroic mirror 26 (s-polarized light) fall on the second polarized light separating prism. Therefore, the light reflected by dichroic mirror 26, such as the light reflected by green dichroic mirror 263, returns from the second polarized light separating prism through the first polarized light separating prism into the light pipe. Thus the entrance surface through which the light returns into the light pipe can be the entire exit surface of the light pipe. The light returned into the light pipe is reflected by the total reflection surface of the entrance aperture plate and falls again on the first polarized light separating prism. Thus the adverse influence of incident angle on the polarization characteristic can be reduced.

In the color separating unit 2a shown in FIG. 1, the half-wave plate 213 is disposed behind the dichroic mirror 26. The dichroic mirror 26 may be disposed behind the half-wave plate 213 for the same optical function. The second polarized light separating prism 212, namely, an s-polarized light deflecting device, may be substituted by a prism having a mirror surface. An integrator, such as a rod prism, may be used instead of the light pipe.

A color separating unit 2b in a second embodiment according to the present invention is now described with reference to FIG. 4. Referring to FIG. 4, color separating unit 2b takes the peripheral light intensity ratio into consideration. When a color distribution about optical axis 100 of an illuminating optical system is not rotationally symmetric, color separating unit 2b takes into consideration an irregular light intensity distribution due to different incident angles of light beams of different colors incident on a rotating polygon reflector. See Japan pat. Appln. No. 2005-137987 for further detail. To take the peripheral light intensity ratio into consideration, red dichroic prisms 251a and 251b, green dichroic prisms 252a and 252b and blue dichroic prisms 253a and 253b, for example, need to be disposed symmetrically with respect to optical axis 100 of the illuminating optical system along the y-axis as shown in FIG. 4.

A polarization converting device included in color separating unit 2b shown in FIG. 4 is formed by disposing polarization converting devices like polarization converting device 21 shown in FIG. 1 symmetrically with respect to optical axis 100 along the y-axis. First polarizing prisms 211a and 211b that transmit p-polarized light and reflect s-polarized light are disposed respectively on the opposite sides of optical axis 100. First polarizing prism 211a is disposed with its polarization plane oriented to reflect s-polarized light upward along the y-axis. First polarizing prism 211b is disposed with its polarization plane oriented to reflect s-polarized light downward along the y-axis. Second polarizing prisms 212a and 212b that transmit p-polarized light and reflect s-polarized light are disposed, respectively, on the opposite outer sides of first polarizing prisms 211a and 211b.

Dichroic mirrors are disposed contiguously with the polarizing prisms. For example, a red dichroic mirror 261a, a green dichroic mirror 262a, blue dichroic mirrors 263a and 263b, a green dichroic mirror 262b and a red dichroic mirror 261b are arranged downward in that order along the y-axis. Red dichroic mirror 261a, green dichroic mirror 262a and blue dichroic mirror 263a are contiguous with the exit surfaces of first polarizing prism 211a and second polarizing prism 212a. Similarly, red dichroic mirror 261b, green dichroic mirror 262b and blue dichroic mirror 263b are contiguous with the exit surfaces of first polarizing prism 211b and second polarizing prism 212b. Half-wave plates 213a and 213b are disposed to correspond to the exit surfaces of second polarizing prisms 212a and 212b, respectively.

In the color separating unit 2b shown in FIG. 4, the exit surface of a light pipe 24 coincides with the entrance surfaces of first polarizing prisms 211a and 211b. Therefore, light beams reflected by the dichroic prisms 251 to 253 travel backward into light pipe 24 at angles not smaller than a predetermined angle. In some cases, such a mode of reflection affects the angle dependence of the light beams reflected by total reflection plates 22 and the light falls again on first polarizing prisms 211a and 211b. In the color separating unit 2b shown in FIG. 4, light beams that have traveled through light pipe 24 and have fallen on a polarization converting device 21' are equally polarized, are separated by color and emerge from color separating unit 2b in a symmetrical color arrangement with respect to optical axis 100. Color separating unit 2b, similarly to color separating unit 2a shown in FIG. 1, separates color light beams taking into consideration the peripheral light intensity ratio and has an improved color separating characteristic dependent on incident angle.

In color separating unit 2b shown in FIG. 4, the ratio of the area of the entrance surface to that of the exit surface is 1/2. Thus the ratio of the area of an entrance aperture 221 to that of entrance aperture plate 22 can be reduced. Although first polarizing prisms 211a and 211b are disposed on the opposite sides of optical axis 100 respectively, and second polarizing prisms 212a and 212b are disposed on the outer sides of first polarizing prisms 211a and 211b, respectively, in color separating unit 2b shown in FIG. 4, the first and the second polarizing prisms may be alternately arranged.

A color separating device 2c in a third embodiment according to the present invention is next described with reference to FIG. 6. Color separating device 2c is pro-vided with a reflecting polarizing plate 21" as a polarization converting device instead of first and second polarizing prisms. For example, the reflecting polarizing plate 21" transmits p-polarized light and reflects s-polarized light. The polarizing plate 21" of color separating unit 2c shown in FIG. 6 reflects about half the light beams that entered light pipe 24, and dichroic mirrors 26, similarly to those shown in FIG. 1, reflect light beams. The number of times of reflection is performed by color separating unit 2c before all the incident light beams emerge from color separating unit 2c is greater than the number of times of reflection is performed by color separating unit 2a shown in FIG. 1. In color separating unit 2c, the entire exit surface of light pipe 24, the entrance and exit surface of polarizing plate 21" and the entrance and exit surface of dichroic mirror 26 can be formed in the same area. Therefore, color separating unit 2c can be formed such that the ratio of the area of its entrance surface to that of its exit surface is 1/1. The aperture can be formed in a small area and light can be used efficiently.

Figure 6:
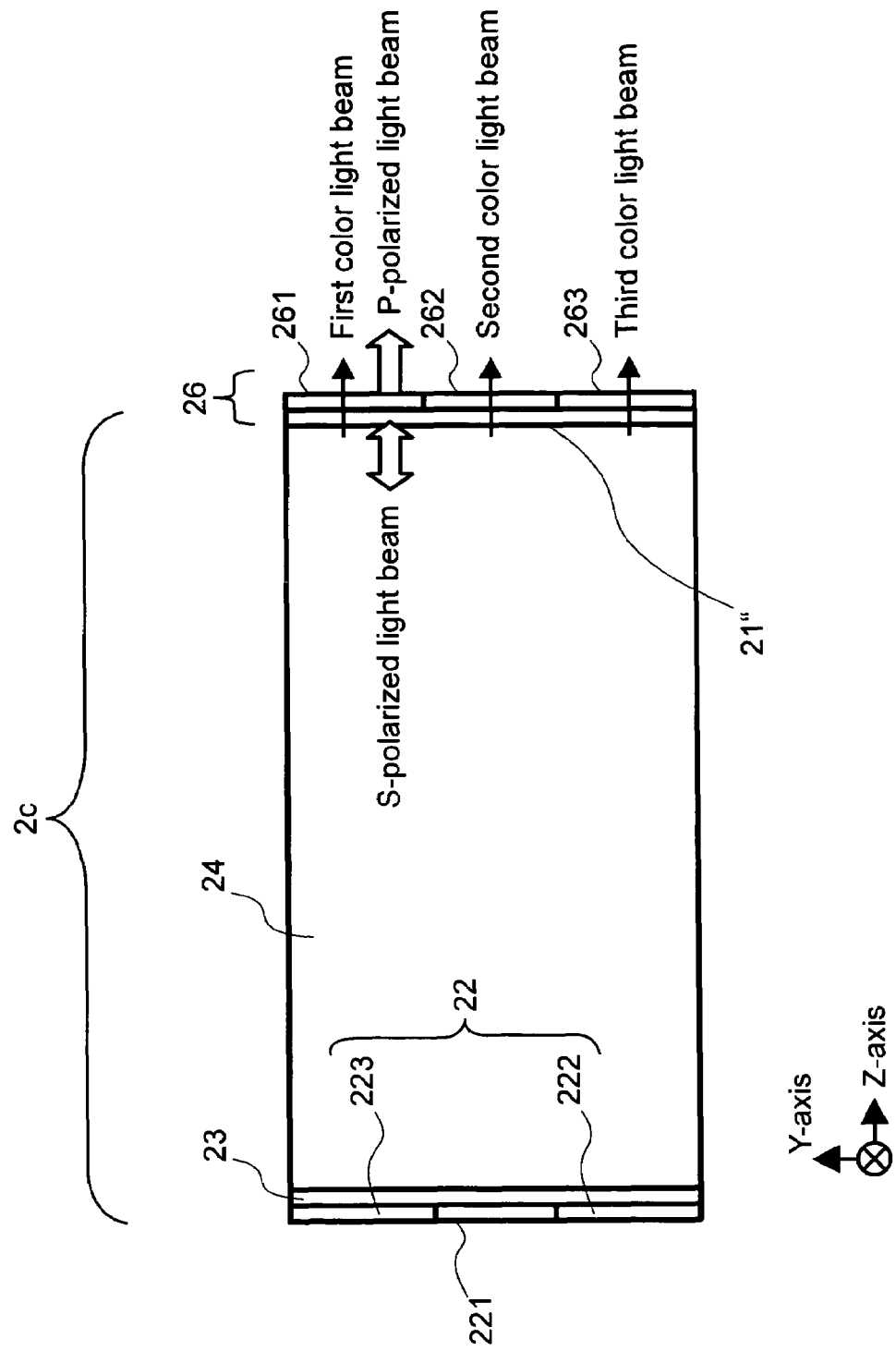
FIG. 6 is a view of a color separating unit in a third embodiment according to the present invention.

In color separating unit 2c shown in FIG. 6, dichroic mirrors 26 are disposed on the outer side of polarizing plate 21", i.e., on the side of a light bulb. However, the respective positions of polarizing plate 21" and dichroic mirrors 26 are interchangeable; that is, polarizing plate 21" may be disposed on the side of the light bulb.

The color separating unit and the projection type video display apparatus of the present invention have improved color separating ability and are capable of reducing color mixing.

What is claimed is:

1. A projection type video display apparatus comprising:
a white light source capable of emitting visible light beams;
a color separating unit for receiving the visible light beams and emitting a plurality of color light beams;
a video display device irradiated with the plurality of color light beams and capable of modulating the color light beams according to image signals corresponding to colors of the plurality of color light beams;
a scanning unit for moving color bars formed by the plurality of color light beams on the video display device in a fixed direction; and
a projection lens through which a color image formed by the plurality of modulated color light beams is projected;
wherein the color separating unit includes:
an optical integrator having an entrance aperture plate provided with an entrance aperture through which the visible light beams travel, and a first exit surface through which the uniformed visible light beams emerge;
a dichroic mirror having a plurality of color separating surfaces capable of transmitting predetermined color light beams included in the uniformed visible light beams and of reflecting color light beams of wavelengths other than those of the predetermined color light beams and disposed substantially parallel to the first exit surface, the color separating surfaces including a red color separating surface for transmitting red color light, a blue color separating surface for transmitting blue color light, and a green color separating surface for transmitting green color light; and a polarization converting device for converting the uniformed visible light beams falling on the dichroic mirror or the plurality of color light beams emerging from the dichroic mirror into predetermined polarized light beams, the polarization converting device being configured to receive P-polarized white light, wherein P-polarized red light passes through substantially all of the red color separating surface, P-polarized blue light passes through only a first portion of the blue color separating surface, and P-polarized green light is reflected by the red and green color separating surfaces, the polarization converting device further being configured to receive S-polarized white light, wherein S-polarized blue light passes through only a second portion of the blue color separating surface, S-polarized green light passes through substantially all of the green color separating surface, and S-polarized red light is reflected by the blue and green color separation surfaces.

2. The projection type video display apparatus according to claim 1, wherein the entrance aperture plate of the optical integrator has an inner surface and the inner surface excluding the entrance aperture is a total reflection surface.

3. The projection type video display apparatus according to claim 1 wherein the polarization converting device includes:
   a polarized light separating prism disposed contiguously with the optical integrator and having a second exit surface from which the predetermined polarized light beams emerge, and a third exit surface from which other polarized light beams emerge;
   a deflecting device for receiving the other polarized light beams emerged from the third exit surface and deflecting the received other polarized light beams so as to travel in a direction in which the predetermined polarized light beams emerge from the second exit surface; and
   a half-wave plate for converting the polarization of the predetermined polarized light beams or the other polarized light beams.

4. The projection type video display apparatus according to claim 3 wherein the polarized light separating prism has an entrance surface in contact with the entire first exit surface.

5. The projection type video display apparatus according to claim 1 wherein the color separating unit includes a quarter-wave plate placed on the total reflection surface of the optical integrator.

6. The projection type video display apparatus according to claim 1 further comprising a polarized light beam splitter capable of transmitting a plurality of color light beams emerged from the color separating unit and fallen on the scanning unit or a plurality of color light beams reflected by the scanning unit and of reflecting the plurality of color light beams reflected by the scanning unit or the plurality of color light beams emerged from the color separating unit and fallen on the scanning unit, wherein the scanning unit is a rotating polygon reflector provided with a plurality of reflecting facets for reflecting a plurality of color light beams.

7. A projection type video display apparatus comprising:
   a white light source capable of emitting visible light beams;
   a color separating unit, for receiving the visible light beams, including:
      an optical integrator having an entrance surface that transmits the visible light beams and a first exit surface from which the uniformed visible light beams emerge,
      a dichroic mirror having a plurality of color separating surfaces disposed substantially parallel to the first exit surface and capable of transmitting predetermined color light beams included in the uniformed visible light beams and of reflecting the visible light beams of wavelengths other than those of the predetermined color light beams, the color separating surfaces including a red color separating surface for transmitting red color light, a blue color separating surface for transmitting blue color light, and a green color separating surface for transmitting green color light, and
      a polarization converting device for converting the plurality of color light beams into predetermined polarized light beams, wherein:
         when the polarization converting device receives P-polarized white light, then P-polarized red light passes through substantially all of the red color separating surface, P-polarized blue light passes through only a first portion of the blue color separating surface, and P-polarized green light is reflected by the red and green color separating surfaces, and
         when the polarization converting device receives S-polarized white light, then S-polarized blue light passes through only a second portion of the blue color separating surface, S-polarized green light passes through substantially all of the green color separating surface, and S-polarized red light is reflected by the blue and green color separation surfaces,
   a video display device irradiated with the plurality of color light beams and capable of modulating the color light beams according to video signals corresponding to colors of the color light beams irradiating the video display device;
   a scanning unit for moving color bars formed by the plurality of color light beams on the video display device in a fixed direction; and
   a projection lens through which a color image formed by the plurality of modulated color light beams is projected.

8. The projection type video display apparatus according to claim 7, wherein the entrance aperture plate of the optical integrator has an inner surface and the inner surface excluding the entrance aperture is a total reflection surface.

9. The projection type video display apparatus according to claim 7, wherein the polarization converting device includes:
   a polarized light separating prism disposed contiguously with the optical integrator and having a second exit surface through which the predetermined polarized light beams are sent to the dichroic mirror and a third exit surface through which other polarized light beams emerge,
   a deflecting device for receiving the polarized light beams emerged from the third exit surface and deflecting the received polarized light beams so as to travel in a direction in which the predetermined polarized light beams emerged from the second exit surface travel, and
   a half-wave plate for converting the polarization of the predetermined polarized light beams or the other polarized light beams.

10. The projection type video apparatus according to claim 9, wherein the polarized light separating prism has an entrance surface in contact with the entire first exit surface.

11. The projection type video apparatus according to claim 7, wherein the color separating unit has a quarter-wave plate placed on the total reflection surface of the optical integrator.

12. The projection type video apparatus according to claim 7, further comprising a polarized light beam splitter capable of transmitting a plurality of color light beams emerged from the color separating unit and fallen on the scanning unit or a plurality of color light beams reflected by the scanning unit and of reflecting the plurality of color light beams reflected by the scanning unit or the plurality of color light beams emerged from the color separating unit and fallen on the scanning unit, wherein the scanning unit is a rotating polygon reflector provided with a plurality of reflecting facets for reflecting a plurality of color light beams.

13. A projection type video display apparatus comprising:
   a white light source capable of emitting visible light beams;
   a video display device capable of forming an optical image corresponding to video signals by using light emitted by the white light source;
   a color separating unit for separating light emitted by the white light source into a plurality of color light beams;
   a scanning unit for moving the plurality of color light beams emerged from an exit side of the color separating unit on the video display device in a fixed direction;
   a first mapping optical system for mapping a plurality of color light beams provided by the color separating unit at a position near the scanning unit;
   a second mapping optical system for mapping a plurality of color light beams deflected by the scanning unit from scanning on the video display device; and
   a projection device for projecting a color image formed by light beams emitted by the video display device;
   wherein the color separating unit includes:
      an entrance aperture plate provided with an entrance aperture through which light beams emitted by the white light source travel and having a total reflection surface around the entrance aperture on entrance side of the color separating unit,
      a quarter-wave plate placed on the total reflection surface,
      an optical integrator, for uniforming the visible light beams passed through the entrance aperture and emitting uniformed light beams,
      a first polarized light separating prism capable of reflecting S-polarized light beams included in light beams emitted by the optical integrator and of transmitting P-polarized light beams included in the light beams emitted by the optical integrator,
      a deflecting device for receiving the S-polarized light beams and emitting the received S-polarized light beams in a direction in which the P-polarized light beams travel,
      a dichroic mirror having a plurality of color separating surfaces capable of transmitting predetermined color light beams included in the uniformed visible light beams and of reflecting color light beams of wavelengths other than those of the predetermined color light beams and disposed substantially parallel to a first exit surface of the color separation unit, the color separating surfaces including a red color separating surface for transmitting red color light, a blue color separating surface for transmitting blue color light, and a green color separating surface for transmitting green color light, and
      a half-wave plate disposed opposite to an exit surface of the deflecting device,
      the red color separating surface being arranged relative to the first polarized light separating prism so that P-polarized red light passes through substantially all of the red color separating surface,
      the green color separating surface being arranged relative to the deflecting device so that S-polarized green light passes through substantially all of the green color separating surface,
      the blue color separating surface being arranged relative to the first polarized light separating prism deflecting device so that P-polarized blue light passes through only a first portion of the blue color separating surface and S-polarized blue light passes through only a second portion of the blue color separating surface.

14. The projection type video display apparatus according to claim 13, wherein the entrance aperture plate of the optical integrator has an inner surface and the inner surface excluding the entrance aperture is a total reflection surface.

15. The projection type video display apparatus according to claim 13, wherein the first polarized light separating prism has an entrance surface in opposing relation to the exit surface of the deflecting device.

16. A color separating unit incorporated into a single-chip projection type video display apparatus, said color separating unit comprising:
   an optical integrator, for combining visible light beams, having an entrance aperture plate provided with an entrance aperture through which the visible light beams travel, and a first exit surface through which the combined visible light beams emerge;
   a dichroic mirror having a plurality of color separating surfaces capable of transmitting predetermined color light beams included in the uniformed visible light beams and of reflecting color light beams of wavelengths other than those of the predetermined color light beams and disposed substantially parallel to the first exit surface, the color separating surfaces including a red color separating surface for transmitting red color light, a blue color separating surface for transmitting blue color light, and a green color separating surface for transmitting green color light; and
   a polarization converting device for converting the uniformed visible light beams falling on the dichroic mirror or the plurality of color light beams emerging from the dichroic mirror into predetermined polarized light beams wherein:
      when the polarization converting device receives P-polarized white light, then P-polarized red light passes through substantially all of the red color separating surface, P-polarized blue light passes through only a first portion of the blue color separating surface, and P-polarized green light is reflected by the red and green color separating surfaces, and
      when the polarization converting device receives S-polarized white light, then S-polarized blue light passes through only a second portion of the blue color separating surface, S-polarized green light passes through substantially all of the green color separating surface, and S-polarized red light is reflected by the blue and green color separation surfaces.

* * * * *